UNITED STATES PATENT OFFICE

RUSSELL MAHANEY, OF WILKINSBURG, AND WILLIAM BRAZELTON, OF PITTSBURGH, PENNSYLVANIA, ASSIGNORS TO WESTINGHOUSE ELECTRIC AND MANUFACTURING COMPANY, A CORPORATION OF PENNSYLVANIA

COMPOSITE MOLDING MICA

No Drawing. Application filed February 4, 1928. Serial No. 252,035.

Our invention relates to a composite insulation containing mica and more particularly to a mica composition having improved physical and electrical properties.

An object of our invention is to provide a sheet of mica insulation composed of mica flakes secured together by an improved binder that is sufficiently adhesive and viscous at the molding temperature to prevent the mica flakes from splitting and flaring apart.

Another object of our invention is to provide an improved binder for mica plates having desirable physical and electrical properties that is solid at room temperature, becomes viscous and adhesive at a temperature of about 160° C. for a considerable length of time, and finally passes directly into the polymerized stage without liquefying.

It has heretofore been the practice to utilize shellac as a binder for mica plates. Shellac, however, is not entirely satisfactory for this purpose because it does not remain viscous for a sufficient length of time to permit the composite plates to be molded. Shellac is solid at room temperature and changes from a viscous to a liquid state when heat is applied. Upon prolonged heating, it again becomes viscous and finally polymerizes into a hard, insoluble and infusible mass. If the heating is stopped at any time during the cycle before complete polymerization, the shellac may be again softened by the application of heat, but when final polymerization has taken place the shellac cannot be softened at ordinary molding temperatures.

Difficulty has been experienced in molding composite sheets of shellac-bonded mica when the shellac binder is in the secondary viscous stage, because, at molding temperatures, the shellac polymerizes and sets before the composite sheets can be molded into the desired form; and, when such sheets are molded before the binder reaches the secondary viscous stage, the shellac becomes liquid and is not sufficiently adhesive to prevent the mica plates from splitting and flaring apart.

After considerable experimentation, we have succeeded in obtaining a suitable bond for mica that not only permits the composite sheet of insulation to be molded at the desired temperature, but mica plates, superimposed on each other and bound together by our improved composition, have better electrical and physical properties than when they are secured together with shellac.

Our improved binder, in its preferred form, consists of the following ingredients in approximately the proportions indicated:

Copal gums 12.5 pounds; China-wood oil 1.5 pounds; alpha nitronaphthalene 1.0 pound; shellac 10.0 pounds.

In preparing the binder, the copal gum and China-wood oil are heated together in an open iron kettle until the gum is liquefied. While all of the copal gum may be mixed with the China-wood oil at one time, we have found it more expedient to mix about one half of the copal gum with the oil, and, after this amount has been liquefied, the remainder of the gum is added in two equal parts at intervals of about 5 minutes. The temperature at which the gum is melted should ordinarily not exceed 195° C., as, at higher temperatures, the gum has the tendency to polymerize. After the copal gum has been completely liquefied, the mixture is maintained at a temperature of between 185 and 190° C. for a period of about 30 minutes.

The alpha nitronaphthalene is then added and the heating is continued at the temperature specified for 20 minutes longer, the mixture being stirred at intervals of 3 to 4 minutes. The alpha nitronaphthalene acts as a fluxing agent to render the mixture of copal gum and China-wood oil receptive to the shellac which is subsequently added.

A sufficient amount of the shellac is now added, with continuous stirring, until the temperature of the mixture is lowered to between 130 and 140° C. The remainder of the shellac should be added in small lots, the composition being kept at about the same consistency and the temperature maintained at between 130 and 140° C. After the shellac has been incorporated in the mixture, which usually requires about 15 minutes, the heating is continued, at approximately the same temperature, for about fifteen minutes, with the exception of the last few minutes, when it has been found advisable to raise the temperature to between 150 and 155° C. to facilitate pouring, but, otherwise, it is essential that the temperature of the mixture should not go above the polymerization temperature of shellac, which is about 140° C. The mixture should be constantly stirred while the shellac is being added and during the subsequent heating period. When the curing process has been completed, the composition is poured into shallow pans and allowed to cool. The softening point of the binder, prepared in the manner specified, should be between 110 and 130° C.

After the binder has been cooled, it is ground until it will pass through an eighty mesh screen, and is then thoroughly mixed with mica plates or splittings. The mixture is next placed between steel plates and heated at a temperature of about 120° C. for approximately two hours to soften the bond and to cause the mica laminations to adhere together in the form of composite plates that may be conveniently handled. The plates are now removed from the oven and allowed to cool, after which they are trimmed to remove the rough edges and are then placed between plates in a press and given a preliminary steam-heat treatment. They are then subjected to heat and pressure at a temperature of about 170° C. for a sufficient length of time to soften the binder but insufficient to polymerize it. The composite sheet of insulation, after being cooled, is then in a condition to be molded under heat and pressure into any desired form.

It is sometimes found desirable to apply the binder in the form of a solution. In such cases, the bond is first dissolved in a suitable solvent, such as alcohol, acetone or a mixture of alcohol and benzene. The solution is then sprayed or brushed on the mica flakes while they are being built up or, if preferred, a laminated sheet of mica plates may be formed by superimposing the mica plates upon each other and impregnating the composite sheet with a solution of the binder. The solvent is then eliminated by evaporation at room temperature, or by heat or in a vacuum, or by a combination of these methods. When the composite sheet of insulation is dry, it may be subjected to heat and pressure in the same manner as when the bond is applied in the dry form.

A composite sheet of insulation comprising mica plates secured together by our improved binder, is less expensive and far superior to composite sheets of mica bound together by shellac. It has especially good insulation properties and has a greater density and transverse strength than shellac-bound mica. When subjected to a pressure of 5000 pounds per square inch, it has 29.3% less compression than a mica plate secured together with shellac. A small amount of compression is considered a very desirable characteristic of mica insulation utilized for making cones for the commutators of direct-current generators, because our improved insulation reaches a stable condition much quicker than shellac-bound mica during the seasoning of the commutator.

Our composite sheets of insulation do not swell under the influence of heat, are viscous, soften readily on a hot plate, are pliable and flexible when hot, but dense and solid when cold. They may be formed without molds by heating over a hot flame and may be wound around desired mandrels. They have less volatile content and are less absorbent of moisture and oil than sheets made with shellac-bound mica. When immersed in a lubricating oil for 96 hours, a sheet of our improved insulation absorbed only from 4 to 6% of oil. Shellac-bonded mica treated in a similar manner absorbed from 80 to 85%.

While we have described a specific form of our invention, it will be understood that various modifications thereof may be made without departing from the spirit of our invention. For example, other vegetable drying oils, such as linseed or perilla oil, may be utilized instead of China-wood oil, and other gums, such as rosin or resin ester gums, may be substituted for the copal gum. Other fluxing agents and especially those having a boiling point above 200° C., such as naphthalene, beta nitronaphthalene and camphor, may be substituted for the alpha nitronaphthalene. It is essential, however, that the softening point of the final binder should be between 110° and 130° C., and preferably between 120 and 125° C.

The proportions of the ingredients may also be varied within wide limits. The copal gum may vary between 10 to 60% of the mixture, in which event, the proportion of the shellac will be varied in a corresponding manner. For the best results, however, the shellac should constitute at least 40% of the mixture, by weight, as, otherwise, the binder will have poor physical properties. The China-wood oil is used as a solvent for the copal gum and will vary in accordance with the amount of copal gum that is used. The alpha nitronaphthalene is employed as a flux to render the solution of copal gum in China-wood oil receptive to the shellac and, of course, varies in quantity in accordance with the amount of shellac that is utilized.

Other modifications will become apparent to those skilled in the art, and we desire, therefore, that only such limitations shall be placed upon our invention as are imposed by the prior art and the appended claims.

We claim as our invention:

1. An insulation composition comprising mica plates secured together by a composition of matter comprising a vegetable drying oil, a resin, a fluxing agent and shellac.

2. An insulation composition comprising mica plates secured together by a composition of matter comprising a vegetable drying oil, a resin, a fluxing agent having a boiling temperature above 200° C., and shellac.

3. An insulation composition comprising mica plates secured together by a composition of matter comprising a vegetable drying oil, copal gum, a nitrated naphthalene and shellac.

4. An insulation composition comprising mica plates secured together by a composition of matter comprising China-wood oil, copal gum, alpha nitronaphthalene and shellac.

5. An insulation material that is solid at approximately 110° C. but soft at between 110° C. to 130° C. and about 170° C., comprising mica secured together by a composition of matter comprising shellac modified by distribution with an organic fluxing agent in a solution of a gum in an oxidized oil.

6. An insulating material that is solid at approximately 110° C. but soft at between 110° C. to 130° C. and about 170° C., comprising mica cemented together by a binding agent comprising at least 40% shellac, said shellac being modified by distribution with an organic fluxing agent in copal gum dissolved in an oxidized oil 7. The method of making a micaceous insulating sheet that is hard at approximately 110° C. but soft at between 110° to 130° C. and about 170° C., comprising melting a resin in a vegetable drying oil below about 200° C., adding an organic fluxing agent, dissolving at least 40% of shellac at a temperature of about 130°–140° C., cooling the mixture to hardness, and then incorporating mica particles.

8. The method of making a micaceous insulating sheet that is hard at approximately 110° C. but soft at between 110° to 130° C. and about 170° C., comprising melting a resin in a vegetable drying oil at 185° to 195° C., then adding a nitrated naphthalene as fluxing agent, dissolving at least 40% shellac at a temperature of between 185° and 130° C., and then incorporating mica particles.

9. The method of making a micaceous insulating sheet that is hard at approximately 110° C. but soft at between 110° to 130° C. and about 170° C., comprising melting a resin in a vegetable drying oil at 186° to 195° C., then adding an organic fluxing agent, dissolving at least 40% shellac at a temperature of between 185° and 130° C., cooling the mixture to hardness, mixing with mica particles to form a sheet, and then gradually heating to about 170° C. under pressure to cure the sheet.

In testimony whereof, we have hereunto subscribed our names this first day of February, 1928.

RUSSELL MAHANEY.
WILLIAM BRAZELTON.